C. J. CUMMINGS.
PLOW FOR POTATO HARVESTERS.
APPLICATION FILED MAY 25, 1917.
1,371,226.
Patented Mar. 15, 1921.
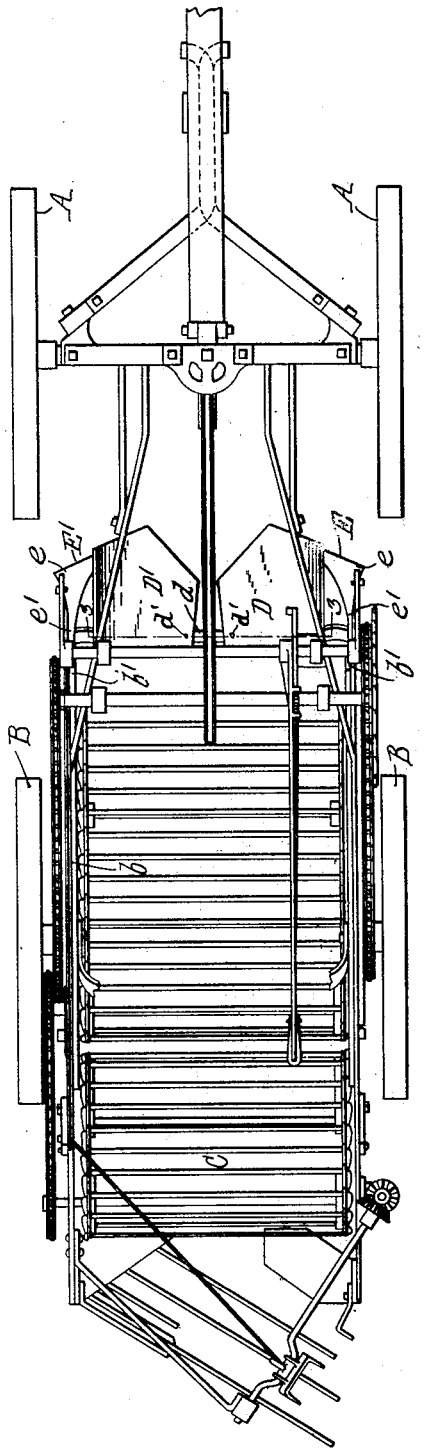
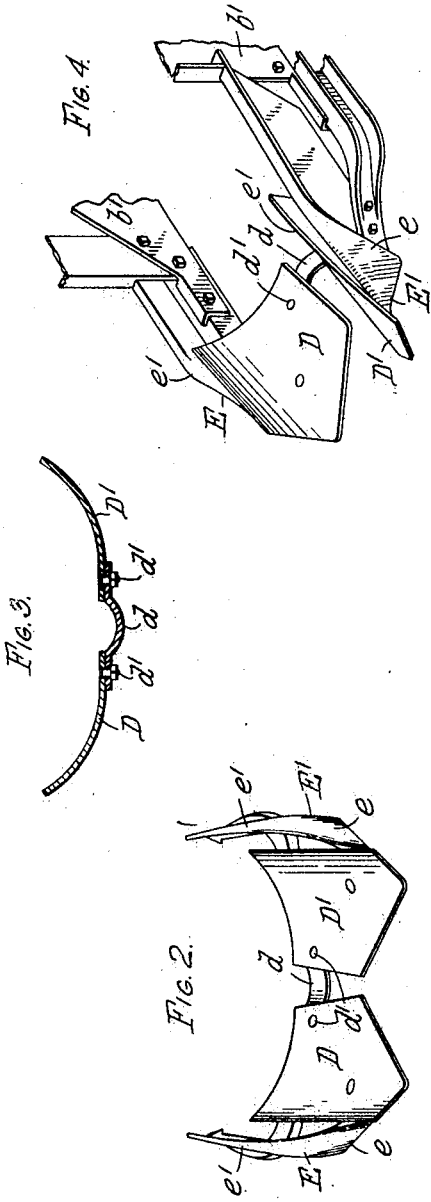
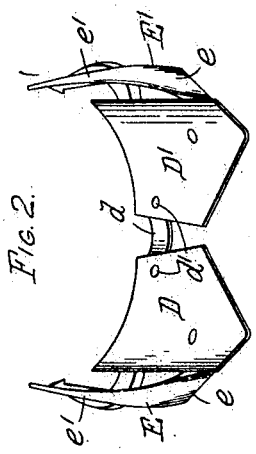
INVENTOR.
Charles J. Cummings,
By Wilhelm & Parker
ATTORNEYS.

UNITED STATES PATENT OFFICE.

CHARLES J. CUMMINGS, OF TULLY, NEW YORK.

PLOW FOR POTATO-HARVESTERS.

1,371,226.  Specification of Letters Patent.  Patented Mar. 15, 1921.

Original application filed April 5, 1915, Serial No. 19,122. Divided and this application filed May 25, 1917. Serial No. 170,988.

*To all whom it may concern:*

Be it known that I, CHARLES J. CUMMINGS, a citizen of the United States, residing at Tully, in the county of Onondaga and State of New York, have invented a new and useful Improvement in Plows for Potato-Harvesters, of which the following is a specification.

This invention relates to potato diggers or harvesting machines, and more particularly to the plows employed on machines of this kind for digging the potatoes up from the ground.

This application is a division of my Patent Number 1,285,632, granted Nov. 26, 1918.

The objects of this invention are to produce a machine of this kind provided with a plow adapted to deflect a part of the earth at the sides of the hills laterally into the depressions or furrows between the hills; also to provide a plow of this kind which is provided with means for deflecting the potato vines toward the middle of the machine to prevent the vines from becoming entangled with the driving mechanism at the sides of the machine; also to improve the structure of the plow in other respects hereinafter specified.

In the accompanying drawings:

Figure 1 is a top plan view of a potato digger provided with a plow embodying the invention.

Fig. 2 is a front elevation of the plow detached from the potato digger.

Fig. 3 is a transverse section thereof on line 3—3, Fig. 1.

Fig. 4 is a perspective view of the plow and parts of the potato digger to which the plow is secured.

The potato digger shown in the drawings on which the plow embodying the invention is arranged, comprises front and rear ground wheels A and B, the rear wheels supporting a frame section $b$ having extensions or parts $b'$ to which the parts of the plow are secured. The frame section $b$ also supports a separator or carrier C to which the potatoes and earth are delivered from the plow and which separates the potatoes from the earth. The plow may be used on a potato digger or harvester of any other construction.

The plow comprises a potato digging plow or portion preferably consisting of two potato digging plow shares or parts D D', and two side plow shares or parts E E', all of which parts are suitably mounted on the extensions or parts $b'$ of the frame of the potato harvester. The two main plow shares D D' are preferably separated by a small space which permits some of the earth and roots to pass between these shares and facilitates the moving of the plow through the ground. This part of the plow structure is usually strengthened or reinforced by a strap or tie $d$ connecting the two main plow shares D D', the structure shown in the drawings being provided with a depressed or U-shaped portion extending across the space between the two main plow shares, permitting the free passage of earth over the surface of the main plow shares. The reinforcing strap $d$ is so arranged that when the harvester is in operation, the strap will pass through the space between the cut and the uncut earth or matter. The ends of the strap or tie $d$ may be secured to the two main plow shares by any suitable means, such as bolts $d'$.

The two side plow shares or parts E E' are arranged at the outer edges of the main plow shares or parts D D' and are so shaped as to turn the earth at the outer portions of the rows, in which the potatoes are planted, outwardly to partially fill up the furrows between the rows. The outer surfaces $e$ of the side plow shares which deflect the earth outwardly, extend from the front portions of the outside edges of the plow parts D D' rearwardly and outwardly away from the plow parts, and the upper edges $e'$ of the side plow shares are inclined upwardly so as to raise any potato vines which may be lying on the ground at the sides of the rows, and to deflect the same toward the center of the machine so that they will not interfere with the driving mechanism at the sides of the machine. These side plow shares are mounted on the extensions $b'$ of the frame section $b$.

The side plow parts turn the opposite sides of the rows in which the potatoes are planted into the furrows or depressions between the rows for the purpose of leveling the field after the harvester has passed over the same. These side plow shares also, owing to the upward inclination of the edges $e'$ thereof, cause the vines at the sides of the rows to be deflected toward the middle of the harvester so that the driving mechanism for the separator or carrier is not in any way interfered with. To further insure the proper centering of the potato vines, the front portions of the side plow shares are preferably joined to the upper front edges of the main plow shares D D'. The upper edges of the side plow shares diverge from the upper edges of the main plow shares from the point of contact therewith, for the purpose of preventing the earth from clogging on the side plow shares.

I claim as my invention:

1. In a potato harvester, the combination with a frame, of a plow mounted on said frame and comprising two upwardly and rearwardly inclined parts separated by an intervening space, and a reinforcing member secured at its opposite ends to the upper rear portions of said parts and having an intermediate portion bridging said intervening space and curved downwardly from said parts to leave the space between said parts unobstructed, said reinforcing member being so arranged that all parts thereof are arranged above the lower edge of said parts of the plow, said space between said parts being smallest at the foremost end thereof and of greater size at the portion thereof adjacent to said reinforcing member.

2. In a potato harvester, the combination with a frame, of a plow mounted on said frame and comprising two upwardly and rearwardly inclined parts separated by an intervening space which is narrowest at the front portion thereof and wider at the rear portions thereof, and a reinforcing member which is secured to said parts of the plow and which bridges said space at the wider portion thereof and which is curved downwardly from said parts to leave the space between said parts unobstructed, whereby said reinforcing member remains under normal conditions out of contact with the furrow.

3. In a potato harvester, the combination with a frame, of a plow mounted on said frame and comprising two upwardly and rearwardly inclined parts separated by an intervening space which is narrowest at the front portion thereof and wider at the rear portions thereof, a reinforcing member which is secured to said parts of the plow and which bridges said space at the wider portion thereof and which is curved downwardly from said parts to leave the space between said parts unobstructed, whereby said reinforcing member remains under normal conditions out of contact with the furrow, and side plow shares arranged at the outer sides of said plow parts and adapted to deflect earth from the sides of the hills into furrows between the hills.

Witness my hand, this 22d day of May, 1917.

CHARLES J. CUMMINGS.

Witnesses:
H. H. HURLBUT,
F. M. BROWN.